United States Patent [19]
Johnson

[11] Patent Number: 4,624,563
[45] Date of Patent: Nov. 25, 1986

[54] WIDE FIELD OF VIEW REMOTE LASER POSITION SENSOR

[75] Inventor: John L. Johnson, Huntsville, Ala.

[73] Assignee: The United States of America as represented by the Secretary of the Army, Washington, D.C.

[21] Appl. No.: 558,000

[22] Filed: Dec. 5, 1983

[51] Int. Cl.$^4$ ............... G01C 1/00; G01J 4/00
[52] U.S. Cl. ..................... 356/152; 356/365; 356/367; 356/141
[58] Field of Search ............... 356/141, 152, 365, 367

[56] References Cited

U.S. PATENT DOCUMENTS

| | | | |
|---|---|---|---|
| 3,572,938 | 3/1971 | Bradford | 356/367 |
| 3,601,613 | 8/1971 | Hock | 356/141 |
| 3,623,814 | 11/1971 | Buhrer | 356/365 |
| 3,657,547 | 4/1972 | Mansfield | 250/203 R |
| 3,670,168 | 6/1972 | Low et al. | 356/141 |
| 3,858,201 | 12/1974 | Foster | 356/141 |
| 4,072,281 | 2/1978 | Miller, Jr. et al. | 244/3.16 |
| 4,247,059 | 1/1981 | Duke et al. | 244/3.16 |

OTHER PUBLICATIONS

M. Francon, "Optical Interferometry", *Academic*, New York, 1966, pp. 137–141.
T. H. Peek, "Use of Savart Plates in Grating Interferometers", Applied Optics, vol. 10, No. 5, May 1971, pp. 1092–1096.
T. H. Peek, "Generalization of Francon's Modification of the Savart Plate", *Applied Optics*, vol. 10, No. 10, Oct. 1971, pp. 2235–2239.
H. T. Braswell et al., Optical Angular Motion Sensor, Phase One, Final Report, Report #AD-A011 576, Chrysler Corporation Space Division, Apr. 30, 1975, pages (27 pages of interest selected from the 286 page report).
Optics Guide, published by Melles Griot, 1975, pp. 173–175.

*Primary Examiner*—Stephen C. Buczinski
*Assistant Examiner*—Linda J. Wallace
*Attorney, Agent, or Firm*—John C. Garvin, Jr.; Freddie M. Bush

[57] ABSTRACT

A laser position sensor system for viewing a wide field of view for detecting the angular position of a remote laser. A laser beam directed toward the sensor from any position within a 90 degree circular field-of-view can be detected to a positional accuracy of less than 0.1 degree in a two-axis coordinate system. The system utilizes two parallel sensors having field-of-view optics that compress the field-of-view. The compressed output from each optics is directed through a polarizer and filter to a phase shifter. The phase shifter, a pair of birefringent crystals, encodes the angle of incidence of the laser beam as a phase shift between the two components of the polarized input beam. These components, the e-ray and the o-ray travel different paths through the phase shifter. Subsequently, an analyzer such as a Wollaston prism decomposes the beam into two linear components. These components are condensed through a reimager lens and coupled to a pair of intensity detectors. The detector outputs from each sensor can then be combined to provide a normalized signal proportional to a trigonometric function of the angle of incidence of the laser beam, indicative of its position in space.

7 Claims, 6 Drawing Figures

WIDE FIELD OF VIEW REMOTE LASER POSITION SENSOR

DEDICATORY CLAUSE

The Invention disclosed herein may be manufactured, used, and licensed by or for the Government for governmental purposes without the payment to me of any royalties thereon.

SUMMARY OF THE INVENTION

An optical sensor system for determining the angular position of a remote laser beam anywhere within a 90 degree field of view to a positional accuracy better than 0.1 degrees in two axes. Inverted microscope optics compress the field of view subtended by the sensor system. A laser beam within the field of view of the sensor system passes through the optics and impinges on a pair of orthogonal, single axis, angular position sensors which use birefringent encoding crystals as their principal functional component. The birefringent crystals encode the angle of incidence of the laser beam as a phase shift of polarized components on each axis. Subsequently, splitting the encoded components with a polarization analyzer, converting the optical energy to electrical energy, and then measuring the relative intensities of the two output electrical components allows the angle on each axis to be read out. For each sensor, the difference between the intensities of the two output beams, when divided by their sum, is the normalized ratio indicative of the angular position of the laser beam source with respect to a normal to the surface of the sensors.

DESCRIPTION OF THE PREFERRED EMBODIMENT

Figure 1:
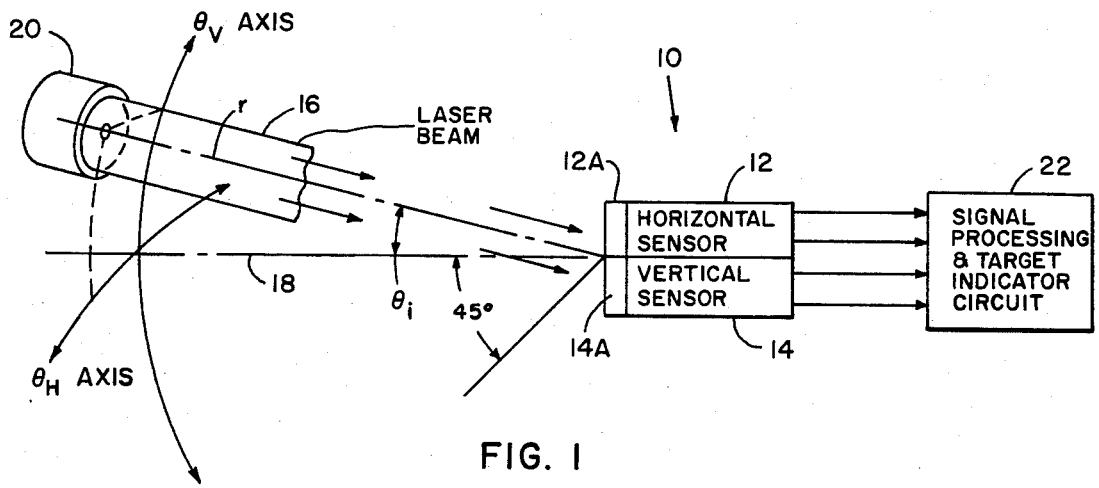
FIG. 1 is a perspective diagram of a wide field of view remote laser position sensor system showing an impinging laser beam thereon

Referring now to the drawings wherein like numbers represent like parts, FIG. 1 discloses a preferred embodiment of the wide field of view remote laser position sensor system 10 wherein a horizontal sensor 12 provides a first channel for processing optical energy therethrough, and a vertical sensor 14 lies immediately adjacent channel 12 for providing a second channel. The respective channel sensors are disposed to subtend a solid angle of 90 degrees field-of-view having a central axis 18 normal to the optical input surface of the sensors. In essence, each sensor would have a line normal to the surface projecting out into space around which a 45 degree angle of revolution can be made with another line also originating at the sensor head to define the field-of-view. However, due to the diameter of a remote laser beam 16 impinging on the small closely adjacent optical heads 12A and 14A of the respective sensors, each sensor may be considered for purposes of illustration as having the common axis 18 normal to the surface, as shown, since no significant loss occurs in the measured angular position data. A laser source 20 spatially located remotely from the sensors directs laser beam 16 toward the sensors. If laser 20 lies within the field of view of the sensors, as defined by the 45 degree cone of revolution identifying the field of view of the sensors, the laser 20 may be considered as lying in a spherical segment capping the cone of revolution, and wherein each point of the segment is equidistant (r) from the center located at the sensor head. The laser 20 lies at an angle $\theta_i$ away from normal axis 18, where $\theta_i$ is $\leq 45$ degrees. Sensors 12 and 14 each have two outputs which are coupled to signal processing and target indicator circuitry 22 for combining the respective signals and thereby indicating the horizontal and vertical components of the incidence angle $\theta_i$ at which laser beam 16 is impinging on the sensor system 10.

Figure 2:
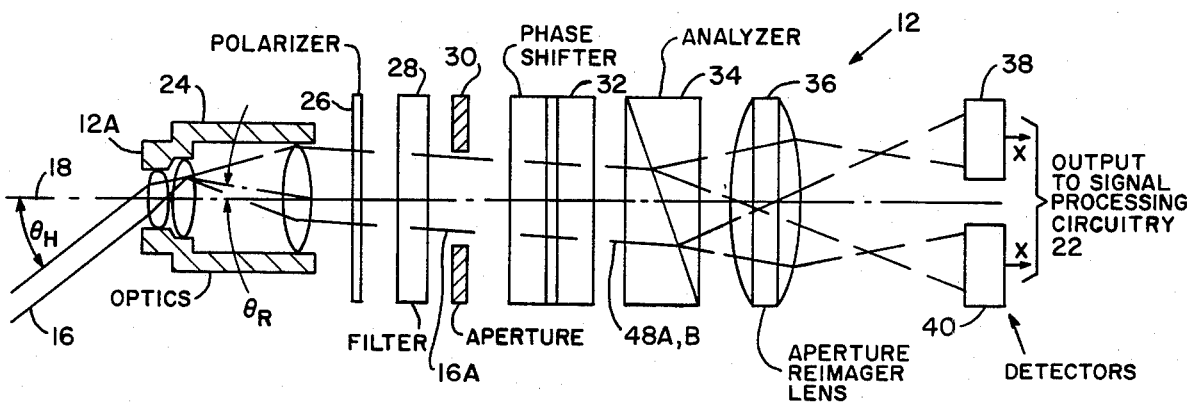
FIG. 2 is a schematic diagram of a single sensor showing a typical optical path therethrough.

FIG. 2 discloses the particular components and arrangement for processing the laser beam through horizontal sensor 12. Since operation of sensors 12 and 14 is identical, operation of vertical sensor 14 is not set forth. Laser beam 16 impinges on the field-of-view optics 24 which compress the field-of-view and direct the laser beam through a polarizer 26 to a spectral line filter 28 which selects the particular wavelength that is to be passed. Optics 24 compresses the horizontal component, $\theta_H$, of the angle of incidence $\theta_i$ of the laser beam by a constant, R, which is the field-of-view reduction factor of optic 24, and is fixed by the particular choice of front end optics 24. Thus, an angle of incidence $\theta_R$ seen by subsequent components is related to $\theta_H$ by the equation $\sin \theta_R = R \sin \theta_H$. If laser light 16 is the same wavelength as the filter 28 the polarized wavelength of laser energy is coupled through filter 28, and an aperture 30 to a phase shifter 32. The output of phase shifter 32 is then coupled to an analyzer 34 which divides the beam into two linearly polarized components which are respectively parallel and normal to the polarization of input beam 16 and directs these components to a reimaging lens 36. Lens 36 is an aperture (30) reimaging lens and directs the two component beams to respective detectors 38 and 40. Reimaging the internal aperture 30 provides a more uniform and full illumination of the detectors and thus eliminates any problem due to responsivity variations across the surface of the detector. Detectors 38 and 40 convert the amplitudes of the impinging optical waves into electrical voltages which, when differentially combined, identify or define the precise source of laser energy 16. These electrical voltage outputs are coupled to the signal processing and target indicator circuitry 22 where they are combined to provide sum and difference signals indicative of the direction from which the original impinging light beam 16 is coming.

Figure 3:
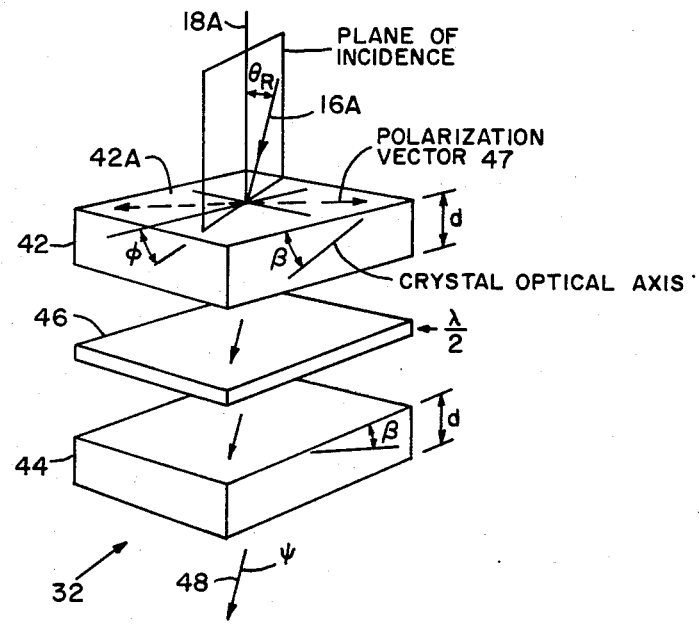
FIG. 3 is a diagram of a modified Savart plate for providing the phase shift function of FIG. 2.

Phase shifter 32 is a Savart plate that encodes the angle of incidence as a phase shift between the two components of the polarized input beam. The operation of the Savart plate, phase shifter 32, is shown in FIG. 3. FIG. 3 discloses a modified Savart plate similar to that taught by M. Francon in the text "Optical Interferometry", 1966, Chapter 7; and as also discussed by T. H. Peek in *Applied Optics* Volume 10, No. 10, Oct. 1971, beginning at page 2235. These references teach birefringent crystals cut with the optical axis at an angle to the surface. In FIG. 3 the birefringent crystals 42 and 44 have the same thickness and are both cut with their optical axes at an angle $\beta$ to the surface. Plate 44 is rotated 180 degrees around axis 18A from plate 42. A half-wave ($\lambda/2$) retarder plate 46 is disposed between the two crystals 42 and 44 and the stack is cemented together. A ray 16A passing through filter 28, with its linear polarization vector 47 at 45 degrees to the principal section, enters crystal 42 at an incident angle $\theta_R$ to the normal 18A to the crystal surface. Normal 18A and ray 16A define a common plane of incidence normal to the surface 42A of the crystal. When the ray 16 enters crystal 42 it is divided into ordinary and extraordinary rays (o-ray and e-ray) traveling different paths through the crystal. The polarizations of these rays are interchanged by the $\lambda/2$ plate and are further refracted by crystal 44. They emerge as parallel, superimposed rays 48A and 48B, having a relative phase shift because they have traveled different paths through the plate.

The Savart plates function as a shearing interferometer which offsets one ray with respect to the other. The half-wave plate interchanges the polarization vector of each ray with respect to the plates. This causes the output rays to have very little shearing left in the beam, with the phase shift between the components (e-ray and o-ray) being the major effect. While the e-ray and o-ray are operated on separately by the components of the Savart plate, they are not sufficiently removed from one another to be separate beams. Thus, the output beam 48 is still a single beam having components 48A and 48B with a phase shift therebetween. The degree of phase shift is a function of the angle of incidence $\theta_R$ of the input beam 16A. Thus, the Savart plate encodes the angle of incidence as a phase shift between the two components of the polarized input beam. The resultant beam 48 is elliptically polarized, and the amount of ellipticity depends upon the angle of incidence as shown diagrammatically in FIGS. 5A and 5B. This elliptically polarized wave is analyzed in detail by Peek in the Applied Optics article set forth hereinabove, first paragraph, page 2238; in references 3 and 8 of the article, and from the equations 1, 2, and 4 therein. Peek discloses that this particular variation of the Savart plate has great linearity over a large field of view.

Following the modified Savart plate, the beam 48 is decomposed into two separated linear components by the Wollaston prism analyzer 34, which also has a large field of view. These two beams are then condensed by the aperture reimaging lens 36 and directed to the pair of intensity detectors 38 and 40.

Figure 5A:
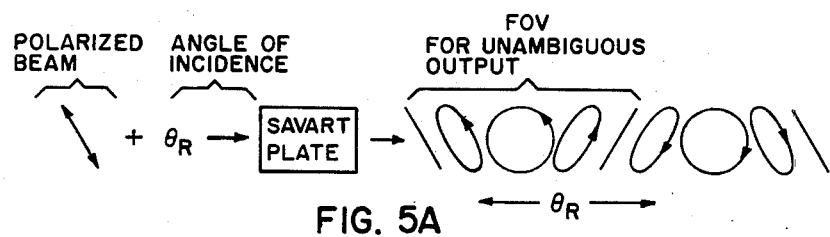
FIG. 5A is a qualitative schematic of the induced ellipticity of the output wave.
Figure 5B:
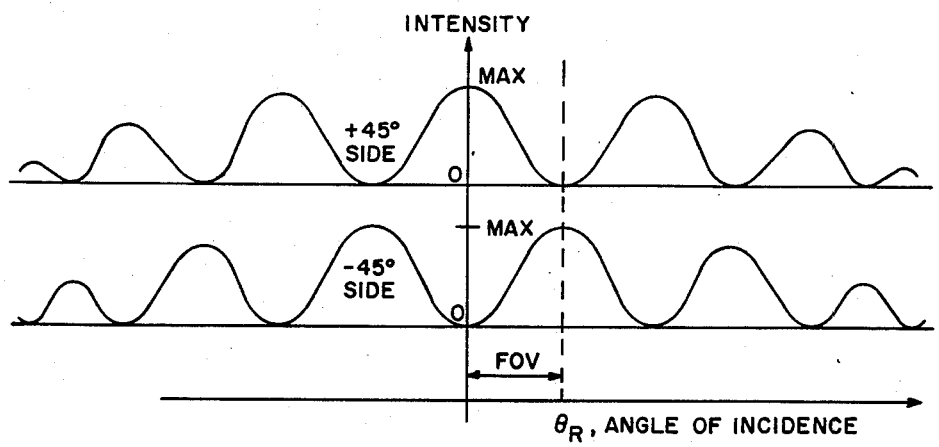
FIG. 5B shows typical analyzed output signals encoded by the Savart plate.

By selecting Savart plate parameters so that the desired field of view covers one-half of one cycle, the entire range of angles is mapped into one unambiguous region of the output signals, as is shown in FIG. 5B and discussed hereinbelow.

Outputs from the horizontal and vertical sensors 12 and 14 are coupled to the signal processing and target indicator circuitry 22 for indicating the particular location of the laser beam source 20. Numerous circuits are well established for providing such signal processing and target indicating functions. Typical of such circuits is an oscilloscope for displaying the field-of-view on the screen and responsive to signal processing to indicate the sector of the quadrant in which the laser source is directing the beam from. U.S. Pat. No. 4,247,059 issued to J. R. Duke et al discloses typical signal processing circuitry in FIGS. 3 and 4 for providing vertical and horizontal position error signals and providing vertical guidance signals or correction signals indicative of coordinate positional changes as an output.

Similarly, U.S. Pat. No. 3,657,547 issued to G. R. Mansfield discloses signal processing circuitry which normalizes the input signal and provides the vertical and horizontal or pitch and yaw angular error. Normalizing is accomplished by dividing the vertical or horizontal difference signals by the sum of the total signal received to provide a measure of angular error of the optical energy source from the optical heading null axis. Normalizing the signal prevents residual signal fluctuation from affecting the angular position data. Miller, Jr. et al in U.S. Pat. No. 4,072,281 also discloses an optical attitude reference system and, as shown typically in FIGS. 8, 9, and 10, discloses o-ray and e-ray processing through sum and difference circuitry to obtain error signals indictative of the position of a remote target with respect to a tracking system. Any of these error or tracking systems can provide an electrical output indicative of an optical input which can be shown as coordinate or angular position indicating data on an oscilloscope. In view of the well established nature of such signal processing and target indicator circuitry, such circuitry is not disclosed in detail herein and is not considered germane to the subject invention.

Figure 4:
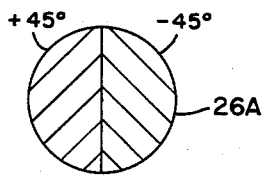
FIG. 4 is a diagram of a typical segmented polarizer.

The incoming laser beam is polarized by a fixed linear polarizer. Since the unit is a non-imaging device, a segmented polarizer can be used to assure that the correct polarization is obtained regardless of the polarization state of the original beam. As shown in FIG. 4, a typical segmented polarizer 26A comprises two half-circles of sheet polarizer cut so that one has its polarization vector at $=45°$ and the other has its polarization vector at $-45°$, and the segments being placed adjacently to form a circular aperture. Thus, for a segmented polarizer in each sensor, the horizontal and vertical sensors are disposed with the same orientation toward the field of view. For a fixed linear polarization 26 the vertical channel sensor is rotated 90 degrees with respect to the horizontal channel sensor orientation.

The induced phase shift between the e-ray and the o-ray which encodes $\theta_i$ in radians, is $$\psi = \frac{4\pi d}{\lambda}(n_0 - n_e)\sin\theta_{R1}\sin\phi\sin 2\beta \quad (1)$$

where
$\theta_{R1}$ = interior angle of inicidence $\equiv$ Arc sin [(R/n)(sin $\theta_i$)](not shown)
$\lambda$ = wavelength of the spectral line filter,
d = thickness of each crystal of the Savart plate,
$\theta_i$ = angle of incidence of laser energy, variable,
$\phi$ = angle between plane of incidence and principal section of crystals in the Savart plate,
$\beta$ = crystal cut angle
R = field of view reduction factor
$n_o, n_e$ = indices of refraction of the uniaxial birefringent crystal.

The Wollaston prism is set to divide the beam into linear components parallel ($I_\parallel$) and normal ($I_\perp$) to the polarization of the input beam. The difference between the detected intensities of the two output beams when divided by their sum is the normalized ratio $$I_n = \frac{I_\parallel - I_\perp}{I_\parallel + I_\perp}\cos\psi. \quad (2)$$

By choosing $\phi = \pi/2$ (the most sensitive orientation), shifting the $\psi$ origin, and assuming identical responsivity and linearity of the detectors, the final signal can be written as $$S = \sin(k \sin \theta_R) \quad (3)$$

where, to first order in $\Delta n$, $$k = \frac{2\pi d}{\lambda} \frac{\Delta n}{n_0} \sin 2\beta. \quad (4)$$

where
$\Delta n = n_e - n_o$ and is typically less than 10% of $n_o$ for most crystal materials. The $\psi$ origin is shifted by 90° in phase. This is done by physically tilting the Savart plate around its sensitive axis by a bias tilt angle numerically equal to one-half the compressed field of view.

The parameters $\Delta n$, $n_o$, $d$, $\lambda$, and $\beta$ are constrained to give k sin $$\theta_{R\,max} + \pm \pi/4 \quad (5)$$

which provides the desired unambiguous signal output. Typical component specifications are:
Input Beam FOV ±45°
Reducing Optics 24 10 to 1 Input Polarizer 26 Polaroid HN-22, HN-32, KN-36 sheet polarizer (typical)
Savart Plate 32 quartz, surface area:
  2 cm=2 cm,
  Crystal cut: $\beta = 2°$,
  wavelength: 6328A,
  Crystal thickness: 1.75 mm for each plate
Wollaston Prism 34
  calcite Area: 2 cm×2 cm,
  Output 10° between output beams
Condensing Lens 36 2 cm diameter, 0.8 cm focal length
Detectors 38 and 40
  UDT PIN-Spot 2D having an
  Active Area: 0.05"×0.1",
  Two elements with 0.005" gap,
  NEP: (1 kHz) 9 ×10$^{-14}$ w/Hz$^{\frac{1}{2}}$
  Frequency response: 35 MHz The reducing optics can, for example, be a negative f/0.5 lens and a f/6.4 positive lens, both 2 cm in diameter and set 11.8 cm apart, or a standard microscope objective with a 0.85 N.A. followed by a 5 cm focal length collimating lens. The latter corresponds to a 116° included angle and gives a FOV somewhat larger than 90° at the expense of a smaller input aperture. The former example has about a 110:1 reduction in its effective aperture area, so its collection efficiency is approximately a factor of 4 larger than the latter.

The selection criteria for Savart plate parameters is given by equation (5). Since $\sin \theta_R$ (max) $= R \sin \theta_H$ (max) and in view of equation (4) it is apparent that all the parameters (R, d, $\lambda$, $\beta$, $\Delta n$, $n_o$) other than $\theta_H$ (max) are selectable and not uniquely fixed. This allows the wavelength of the sensor to be chosen to fit the laser beam. The FOV reduction factor R can be selected to give a practical and optically feasible lens system (such as the microscope objective). The crystal material is selectable. For example, quartz has other desirable properties such as availability, uniformity, hardness, low absorption, etc., which other optical materials might not have. Thickness versus cut angle offers a trade off in order to ease any manufacturing difficulty of a Savart plate.

This allows flexibility in meeting the FOV versus half-cycle of plane constraint, and allows freedom in selection of parameters so that the sensor has all the other desirable features such as the right wavelength, a big FOV, and readily available and easily manufactured optical components.

The particular half-cycle of the phase shift which is used is determined by the bias tilt angle given to the Savart plate, and it is important to keep this tilt as small as possible in order to avoid the third order abberations mentioned by Peek. Thus the half cycle to be used is the first one, as shown in FIG. 5B, and corresponds to the smallest required bias tilt angle.

FIG. 5A discloses a qualitative schematic of the induced ellipticity of the output beam 48 from the Savart plate. The polarized beam at the angle of incidence $\theta_R$ to the Savart plate produces an output beam whose ellipticity varies across the field of view, as shown in FIG. 5B. Thus by orienting the Wollaston prism to analyze the ± 45° components (parallel and normal to the original +45° polarizer), the detectors outputs will vary as shown and the field of view is limited by the parameters to the FOV shown in FIG. 5B.

The resolution of a sensor is essentially equal to the signal-to-noise ratio of the output. In locating remote lasers, the on-axis signal is relatively large. For proper operation, there can be only one bright source having the wavelength in the FOV at a time, since the entire FOV is always incident on the detectors.

For the UDT PIN-Spot 2D detector and a 1 mW HeNe laser input beam, the signal to noise ratio (SNR) is on the order of $$S/N = \frac{(10^{-3}W) \times (5 \times 10^{-3}) \times (\frac{1}{4} \times \frac{1}{2})}{2 \times (9 \times 10^{-14} W/Hz^{\frac{1}{2}}) \times (10^3 Hz)^{\frac{1}{2}}} = 1.5 \times 10^5$$

Where $(5 \times 10^{-3})$ is the reducing optics attenuation and $(\frac{1}{4} \times \frac{1}{2})$ is the effect of the various polarizers on the signal. Since the system is required to resolve one part in nine hundred, the system will provide at least this amount even under adverse conditions.

It is to be understood that the form of the invention, herewith shown and described is to be taken as a preferred example of the same, and that various changes may be resorted to without departing from the spirit and scope of the invention. Accordingly, the scope of the invention is to be limited only by the claims appended hereto.

I claim:

1. A remote laser sensor system for processing incoming directional optical energy comprising: first and second optical sensors disposed adjacently in parallel arrangement for detecting impinging optical energy; each of said sensors comprising a polarizer, a spectral line filter, an internal aperture, a phase shifter, a polarization analyzer, a reimaging lens system, and a pair of detectors; and each of said sensors being disposed for directing impinging optical energy sequentially through said polarizer, filter, internal aperture, phase shifter, analyzer and lens system to said detectors; and the outputs of said detectors being electrical outputs responsive to impinging optical energy for defining the angle of incidence of said optical energy.

2. A remote laser sensor system as set forth in claim 1 wherein each of said sensors further comprise optic means disposed adjacent to said polarizer for receiving incoming optical energy, compressing the field of view, and directing the optical energy to said polarizer.

3. A remote laser sensor system as set forth in claim 2 wherein each of said phase shifters comprises a modified Savart plate, said polarization analyzer is a Wollaston prism.

4. A remote laser sensor system as set forth in claim 3 wherein said second sensor optical axis is rotated with respect to said first sensor by 90 degrees, and said optic means is reducing optics having a 10 to 1 reduction.

5. A remote laser sensor system as set forth in claim 4 wherein said polarizer is a segmented aperture polarizer for assuring correct polarization of optical energy passing therethrough regardless of the polarization state of the input beam.

6. A remote laser sensor system as set forth in claim 2 wherein each of said phase shifters is a Savart plate comprising first and second birefringent quartz crystal plates, each cut with an optical axis at a predetermined acute angle to the surface of the crystal, said plates being arranged in parallel, said second plate being rotated 180 degrees from the first, and a half-wave plate sandwiched between the two crystal plates and fixably attached thereto.

7. A remote laser sensor system as set forth in claim 6 wherein said polarizer is a segmented polarizer, and said optic means is a microscope objective in series with a collimating lens and disposed as compressing optics to provide a 10 to 1 reduction, said objective and said collimating lens providing a 90 degree field of view.

* * * * *